(No Model.)

C. W. DAILEY.
VEHICLE.

No. 550,871.

Patented Dec. 3, 1895.

WITNESSES.
Matthew M. Blunt

INVENTOR
Charles W. Dailey
By C. A. Shaw &co.
ATT'YS

UNITED STATES PATENT OFFICE.

CHARLES W. DAILEY, OF CAMBRIDGE, MASSACHUSETTS.

VEHICLE.

SPECIFICATION forming part of Letters Patent No. 550,871, dated December 3, 1895.

Application filed January 2, 1895. Serial No. 533,504. (No model.)

*To all whom it may concern:*

Be it known that I, CHARLES W. DAILEY, of Cambridge, in the county of Middlesex, State of Massachusetts, have invented certain new and useful Improvements in Vehicles, of which the following is a description sufficiently full, clear, and exact to enable any person skilled in the art or science to which said invention appertains to make and use the same, reference being had to the accompanying drawings, forming part of this specification, in which—

Figure 1:
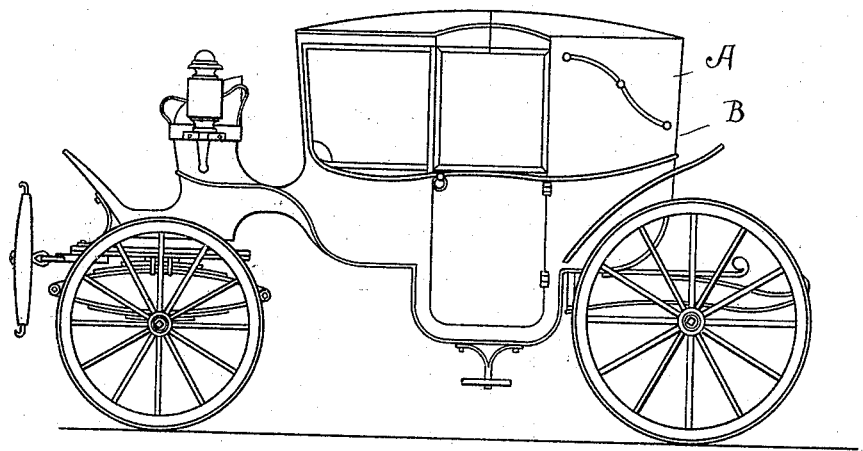
Figure 2:
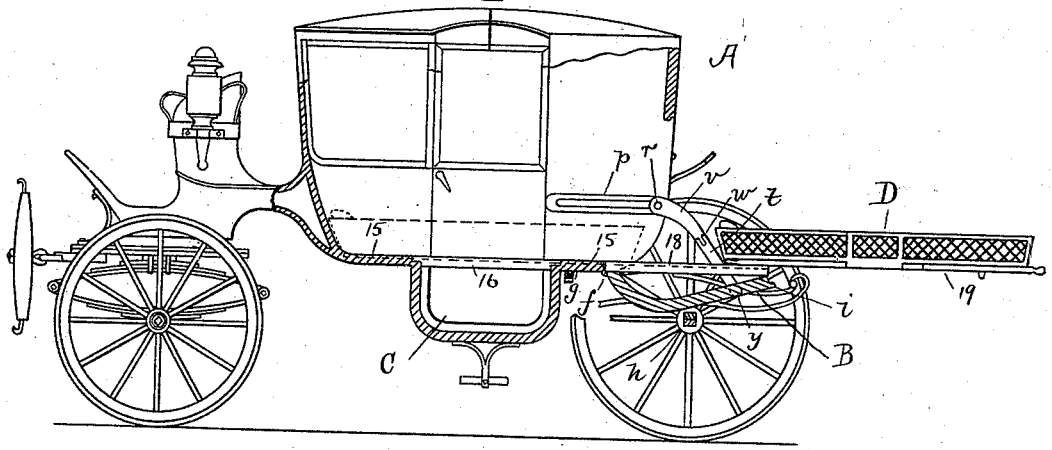
Figure 3:
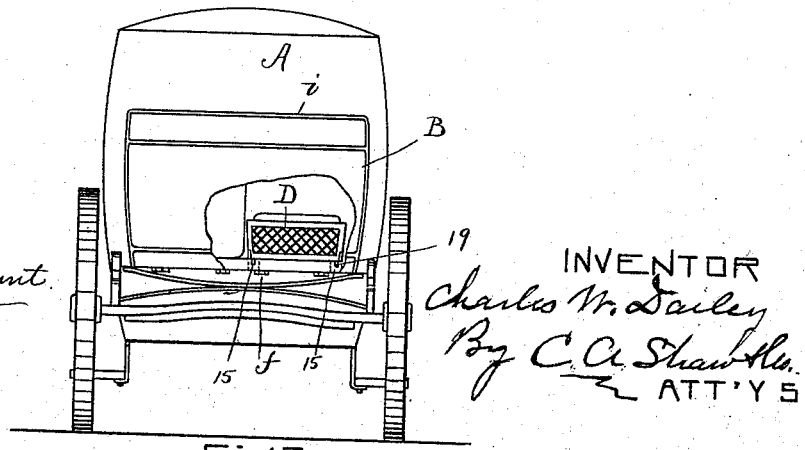

Figure 1 is a side elevation of that class of vehicle known as a "landau," provided with my improvement; Fig. 2, a vertical longitudinal section of the same, showing the stretcher in position to be disposed within the vehicle; and Fig. 3, a rear end elevation, a portion of the vehicle-body being broken away.

Like letters and figures of reference indicate corresponding parts in the different figures of the drawings.

My invention relates especially to that class of vehicles known as "hacks" or "landaus," the object being particularly to adapt such vehicle for use as an ambulance into which a stretcher can readily be disposed for carrying invalids or injured persons.

The nature and operation of the improvement will be readily understood by all conversant with such matters from the following explanation.

In the drawings, A represents the body of the landau, which in its general features is of the ordinary form and construction. The rear wall B is hinged at $f$ (see Fig. 2) to the bottom $g$, so that it will throw outward, as shown in said figure, and rest on the rear axle $h$. The free edge of said wall or lid is grooved or mortised at $i$ to fit tightly when closed. Within the body on a side wall there is a slotted way $p$. A lever $q$ has a pin $r$ in one end, which works in said horizontal way. A lever $t$ is hinged to the outer or free end of the lever $q$ to swing laterally, and is pivoted at $y$ to the lid or wall B. The seat-box or bottom has horizontal ways 15. Said boxes are connected across the foot-rest C of the landau by removable bars 16, which register with and complete said ways 15. Similar removable bars 18 continue the ways across the lid B when thrown outward, as shown in Fig. 2. These removable bars can be disposed beneath the seat of the landau or under the driver's seat. An ordinary padded stretcher D has side or handle bars 19, which will fit into the ways.

In use, when it is desired to dispose the stretcher or bed within the vehicle, the lid B is lowered, as in Fig. 2, and the bars 16 and 18 are adjusted, when the stretcher can be readily made to slide on the ways until entirely disposed within the vehicle. It will be understood that the cushions are first removed. The upholstery of the back conceals the slotted ways $p$ and levers $q\ t$.

Many advantages are derived from my improvement from the fact that carriages of this class ride much easier than ordinary vehicles.

It is designed to supply the vehicles to livery-stables wherein they can be used for all the usual purposes, and yet be subject to call in case of accident. Any suitable means may be employed for locking the falling back B, and I do not confine myself to the particular mechanism shown for supporting the same.

I am aware that specially constructed vehicles of this class have been made with the back to open to receive a stretcher, and I do not claim the same, broadly, when in and of itself considered. Such vehicles, however, are either of extra length or are so cumbered with mechanism inside that they cannot be employed for ordinary riding purposes and are usually of much greater weight because of such construction than can well be handled for pleasure-riding purposes. My improvement overcomes all these objections. The stretcher does not remain in the carriage. The ways are removable and can be concealed under the seat, and there is nothing to indicate to the ordinary observer when the cushions are in place that the vehicle is not an ordinary landau or hack. It is no larger than an ordinary vehicle of its class.

Having thus explained my invention, what I claim is—

The herein described vehicle provided with the downwardly opening back, B, so arranged that its free edge when open is substantially in the plane of the seat boxes; in combination with supports for the back; the seat boxes provided with slide-ways, 15; the detachable rods, 18, connecting the back and seat ways; and the removable rods, 16, connecting the seat ways across the foot-rest of the vehicle, all being arranged to operate substantially as set forth.

CHARLES W. DAILEY.

Witnesses:
ALVIN F. SORTWELL,
EVERETT L. STEVENS.